UNITED STATES PATENT OFFICE.

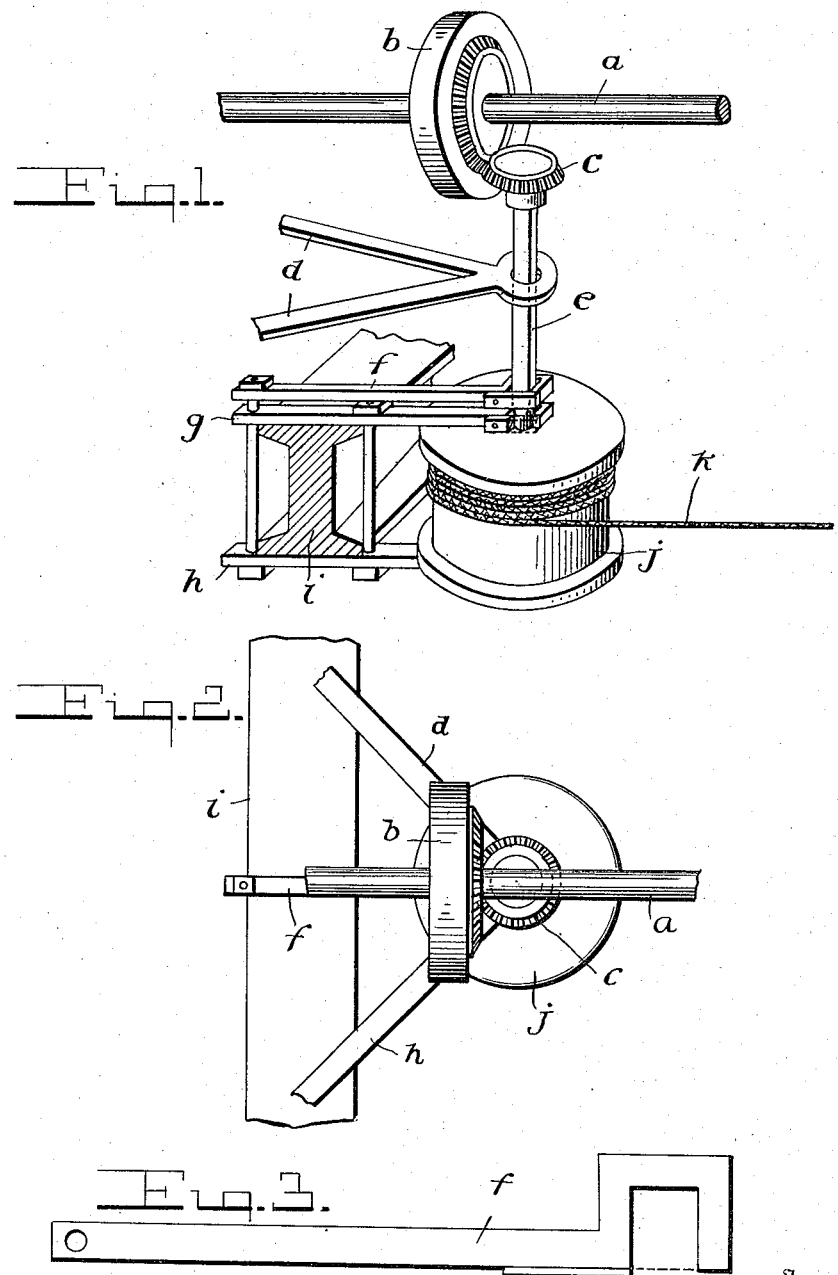

WILLIAM BURKET GRAHAM, OF SAPULPA, OKLAHOMA.

APPLIANCE TO BE ATTACHED TO AUTOMOBILES.

1,217,594. Specification of Letters Patent. Patented Feb. 27, 1917.

Application filed June 30, 1914. Serial No. 848,318.

*To all whom it may concern:*

Be it known that I, WILLIAM BURKET GRAHAM, a citizen of the United States, residing at Sapulpa, in the county of Creek and State of Oklahoma, have invented a new and useful Appliance to be Attached to Automobiles.

This invention is an improved apparatus forming an attachment for an automobile and adapted for use in pulling a stalled automobile out of sand and mud or up steep hills, by being connected to and driven by the engine which furnishes the propelling power for the automobile, the object of the invention being to provide an improved apparatus of this kind, which is cheap and simple, is strong and durable, which may be readily installed and which may be readily operated.

The invention consists in the construction, combination and arrangement of devices hereinafter described and claimed.

In the accompanying drawings:—

Figure 1 is an elevation of my improved automobile extricating apparatus.

Fig. 2 is a plan of the same.

Fig. 3 is a detail plan of the clasp which prevents the unwinding of the towing cable when not in use.

The crank shaft of an automobile is indicated at $a$ provided with a cogged clutch $b$. In the embodiment of my invention I provide a vertical shaft $e$ which is non-circular and is preferably square and which is provided near its lower end with a drum $j$ to which is attached a towing cable $k$, which in practice, is usually about fifty feet long and is preferably made of wire. A gear $c$ is secured to the upper end of the drum shaft for engagement by the cogged clutch $b$ to enable said shaft and its drum to be driven from the crank shaft $a$ when desired.

The drum shaft is mounted in bearings in clamps $g$ and $h$ which are attached to the upper and lower sides of the automobile axle $i$ and which are respectively above and below the drum. A brace $d$ is also provided which has a bearing for the drum shaft $e$ and is adapted to be attached to the automobile frame at a point above the springs of the automobile. A clasp $f$ is also provided which is pivotally mounted on the upper clamp and is adapted to be moved into engagement with the drum shaft to prevent casual unwinding of the cable from the drum when the attachment is not in use.

To use the attachment the cable is first unwound a sufficient length from the drum and its outer end fastened to a stake driven in the ground or any other suitable object in advance of the stalled automobile, and the clasp $f$ being disengaged from the drum shaft, the engine is then started and while the hind wheels are spinning in the sand or mud the operating clutch is caused to engage the gear $c$ thus causing the shaft and the drum to be revolved so that the cable is rewound on the drum and the automobile extricated or moved up the hill as the case may be.

Having thus described my invention, I claim:—

In combination, an automobile including a front axle and a crank shaft, of a pair of forwardly projecting arms secured to the axle, clamps formed on said arms, a vertical squared shaft journaled in said clamps, a substantially V-shaped brace secured to the automobile and extending forwardly therefrom, a bearing formed on the apex portion of said bracket and receiving the shaft, a gear secured to the shaft, a cogged clutch secured to the crank shaft and in mesh with the gear for rotating the shaft, a drum secured to the shaft, a cable secured to a permanent object and to the drum and adapted to wind thereon upon rotation of the shaft, and a clasp pivoted to one of said arms and adapted to engage the shaft to lock said shaft against rotation when desired.

WILLIAM BURKET GRAHAM.

Witnesses:
LEROY J. BURT,
R. SHAHA.

Copies of this patent may be obtained for five cents each, by addressing the "Commissioner of Patents, Washington, D. C."